US007957292B2

(12) United States Patent
Shi et al.

(10) Patent No.: US 7,957,292 B2
(45) Date of Patent: Jun. 7, 2011

(54) TOKEN-BASED CONGESTION CONTROL METHOD FOR THE INTERNET

(75) Inventors: Zhiqiang Shi, Beijing (CN); Zhimei Wu, Beijing (CN); Guiming Fang, Beijing (CN); Yuansong Qiao, Beijing (CN)

(73) Assignee: Institute of Software, Chinese Academy of Sciences, Beijing (CN)

( * ) Notice: Subject to any disclaimer, the term of this patent is extended or adjusted under 35 U.S.C. 154(b) by 205 days.

(21) Appl. No.: 12/522,516

(22) PCT Filed: Nov. 16, 2007

(86) PCT No.: PCT/CN2007/003251
§ 371 (c)(1),
(2), (4) Date: Jul. 8, 2009

(87) PCT Pub. No.: WO2008/124980
PCT Pub. Date: Oct. 23, 2008

(65) Prior Publication Data
US 2009/0296582 A1 Dec. 3, 2009

(30) Foreign Application Priority Data
Apr. 13, 2007 (CN) .......................... 2007 1 0090215

(51) Int. Cl.
*G01R 31/08* (2006.01)
(52) U.S. Cl. ...................... 370/236; 370/235.1; 370/412; 709/224; 709/226; 709/235
(58) Field of Classification Search ............... 370/235.1, 370/236, 230.1, 231, 232, 392, 235, 352, 370/412; 709/224, 226, 235
See application file for complete search history.

(56) References Cited

U.S. PATENT DOCUMENTS

| | | | |
|---|---|---|---|
| 6,388,992 B2* | 5/2002 | Aubert et al. | 370/232 |
| 6,424,624 B1* | 7/2002 | Galand et al. | 370/231 |
| 6,633,575 B1* | 10/2003 | Koodli | 370/412 |
| 6,839,321 B1* | 1/2005 | Chiruvolu | 370/230.1 |
| 6,862,291 B2* | 3/2005 | Talpade et al. | 370/412 |
| 7,280,477 B2* | 10/2007 | Jeffries et al. | 370/235 |
| 7,327,682 B2 | 2/2008 | Gandhi | |
| 7,483,378 B2* | 1/2009 | Chikamatsu | 370/235.1 |
| 7,672,242 B2* | 3/2010 | Chen et al. | 370/235.1 |
| 2002/0097677 A1* | 7/2002 | Hoar et al. | 370/230 |
| 2003/0086413 A1* | 5/2003 | Tartarelli et al. | 370/352 |
| 2007/0280245 A1* | 12/2007 | Rosberg | 370/392 |

OTHER PUBLICATIONS

Shi et al, Token based congestion control: achieving fair resource allocation in P2P networks, May 2008, IEEE.*
Shi et al, Token based congestion control: achieving fair resource allocation in P2P networks, May 2008, ITU-T Kaleidoscope Conference Innovations in NGN.*

* cited by examiner

*Primary Examiner* — Aung S Moe
*Assistant Examiner* — Vinncelas Louis
(74) *Attorney, Agent, or Firm* — SV Patent Service

(57) ABSTRACT

A computer network system with congestion control includes an edge router, a core router, and an inter-domain router in a computer network domain. A token level is inserted into the packet header of a data packet for congestion control in the computer network domain.

24 Claims, 7 Drawing Sheets

| Next Header | Header Length | Token Type | Data Length |
|---|---|---|---|
| tklevel | tkpath | tkdown | tkdowned |
| tkprev | tkback | tkbackdown | PAD1 |
| PAD2 | PAD3 | PAD4 | PAD5 |

Figure 1

TOKEN-BASED CONGESTION CONTROL METHOD FOR THE INTERNET

CROSS-REFERENCE TO RELATED APPLICATIONS

The present application is a national-entry application based on and claims priority to PCT Patent Application PCT/CN2007/003251, entitled "An Internet flow control method based on the token", filed Nov. 16, 2007, which claims priority to Chinese Patent Application No. 200710090215.7, filed Apr. 13, 2007. The content of these applications is incorporated herein by reference.

BACKGROUND

This invention relates to a congestion control technology in a computer network, specifically, a congestion control method for a packet-switched network.

Currently routers used in the Internet are weak in congestion control. Packet loss information is the only network congestion signal provided to the terminal. Network traffic is controlled by the terminal at the transport layer or the application layer. The networks are lack of appropriate policing ability. Recent breakpoint-resume and multi-threaded downloading technologies present challenges to the stability and the fairness of the Internet.

Core-Stateless Fair Queuing (CSFQ) is a technique for enhancing congestion control at the network layer. In CSFQ, edge routers measure and label the flow rate in the packet header. Packets having the same source and destination IP addresses are usually classified into a same flow. Core routers adaptively adjust the parameter of the fair bandwidth according to the congestion state at the output port. The core router can calculate reception probability of a packet using the fair bandwidth and the flow rate in the packet header. The core routers adaptively adjust the parameter of the fair bandwidth according to the congestion state at the output port. The edge routers can therefore provide differentiated services using bandwidth-weighted flow rates based on the access bandwidth. The CSFQ technique, however, has several shortcomings: firstly, the technique is unable to provide fair services in the presence of Bit-Torrent (BT) downloading. A single BT downloading includes multiple destinations. CSFQ cannot properly restrict the total throughput of a BT download because CSFQ identifies a flow only by its source and destination addresses. A BT download can thus increase its own throughput by increasing the number of sessions at the sacrifices of the throughputs of other traditional applications. BT downloads thus affect the fairness and the stability of the Internet. Moreover, due to lack of trust between different domains, flows are measured and re-labeled at the domain border, which becomes a performance bottleneck. Furthermore, for inter-domain measurements and re-mark rate of conversation, the bandwidth weights of the flows are inevitably lost. The bandwidth weight is in effect only inside its domain and cannot be credibly passed on to other domains, which limits the flexibility of CSFQ.

SUMMARY

In one general aspect, the present invention relates to a computer network system with congestion control, comprising: an edge router in a first computer network domain and in communication with a source terminal in the first network domain, wherein the edge router can receive an outgoing packet from the source terminal, the outgoing packet having a packet length and a packet header that includes a token level, wherein the edge router comprises a first token-bucket controller that can pass the outgoing packet when the first token resource is more than the product of the token level and the packet length, wherein the first token-bucket controller can drop the outgoing packet when the first token resource is less than the product of the token level and the packet length; a core router in the first computer network domain and in communication with the edge router, wherein the core router comprises a first physical congestion controller that can pass the outgoing packet received from the edge router when the token level in the outgoing packet is higher than a first physical congestion threshold, wherein the first physical congestion controller can randomly drop the outgoing packet at a first fair probability when the token level in the outgoing packet is lower than the first physical congestion threshold, wherein the first fair probability is dependent on the first physical congestion threshold and the token level; and an inter-domain router in the first computer network domain and in communication with the core router and a second network domain, wherein the inter-domain router comprises a second physical congestion controller that can pass the outgoing packet received from the core router to the second network domain when the token level in the outgoing packet is higher than a second physical congestion threshold, wherein the second physical congestion controller can randomly drop the outgoing packet received from the core router at a second fair probability when the token level in the outgoing packet is lower than the second physical congestion threshold, wherein the second fair probability is dependent on the second physical congestion threshold and the token level.

In another general aspect, the present invention relates to a method for congestion control in a computer network, comprising: receiving an outgoing packet by an edge router from a source terminal, wherein the edge router and the source terminal are in a first computer network domain, wherein the outgoing packet has a packet length and a packet header that includes a token level, wherein the edge router comprises a first token-bucket controller; passing the outgoing packet by the first token-bucket controller when the first token resource is more than the product of the token level and the packet length; dropping the outgoing packet by the first token-bucket controller when the first token resource is less than the product of the token level and the packet length; receiving the outgoing packet from the edge router by a core router in the first computer network domain, wherein the core router comprises a first physical congestion controller; passing the outgoing packet by the first physical congestion controller when the token level in the outgoing packet is higher than a first physical congestion threshold; randomly dropping the outgoing packet at a first fair probability by the first physical congestion controller when the token level in the outgoing packet is lower than the first physical congestion threshold, wherein the first fair probability is dependent on the first physical congestion threshold and the token level; receiving the outgoing packet from the core router by an inter-domain router in the first computer network domain, the inter-domain router comprises a second physical congestion controller; passing the outgoing packet by the second physical congestion controller to the second network domain when the token level in the outgoing packet is higher than a second physical congestion threshold; and randomly dropping the outgoing packet at a second fair probability by the second physical congestion controller when the token level in the outgoing packet is lower than the second physical congestion threshold, wherein the second fair probability is dependent on the second physical congestion threshold and the token level.

Implementations of the system may include one or more of the following. The first token-bucket controller can decrease the first token resource in the edge router by the product of the packet length and the token level of the outgoing packet when the first token-bucket controller allows the outgoing packet to pass. The inter-domain router can further include a second token-bucket controller configured to receive an incoming packet from the second network domain, wherein the second token-bucket controller can pass the incoming packet to the first network domain when the product of the token level and the packet length of the incoming packet is less than a second token resource in the second token-bucket controller, wherein the second token-bucket controller can decrease the second token resource by the product of the token level and the packet length in the incoming packet, wherein the second token-bucket controller can drop the incoming packet when the product of the token level and the packet length of the incoming packet is more than the second token resource. The first physical congestion controller in the core router can allow the outgoing pack to pass at a probability equal to one minus the first fair probability when the token level in the outgoing packet is lower than the first physical congestion threshold, wherein the first physical congestion controller in the core router is configured to set the token-level of the outgoing packet to the first physical congestion threshold. The second physical congestion controller in the inter-domain router can allow the outgoing pack to pass at a probability equal to one minus the second fair probability when the token level in the outgoing packet is lower than the second physical congestion threshold, wherein the second physical congestion controller in the core router is configured to set the token-level of the outgoing packet to the second physical congestion threshold. The first physical congestion controller in the core router can obtain an updated physical congestion threshold by multiplying the physical congestion threshold by a v/C ratio, wherein v is the output rate of the outgoing packet at the physical congestion controller and C is the link speed of the core router. The first fair probability is the difference between the first physical congestion threshold and the token level of the outgoing packet at the core router, multiplied by 1.1 and divided by the first physical congestion threshold. The second fair probability is the difference between the second physical congestion threshold and the token level of the outgoing packet at the inter-domain router, multiplied by 1.1 and divided by the second physical congestion threshold. The inter-domain router can further include a virtual congestion controller in communication with the second physical congestion controller, wherein the token level of the outgoing packet is decreased by a virtual congestion threshold κ when the outgoing packet passes virtual congestion controller. The virtual congestion controller can increment the virtual congestion threshold by $(\mu-S)/v$, wherein $\mu$ is the output rate of the product of the token level and the packet length in the outgoing packet, wherein S is the allowable token output rate of the virtual congestion controller, wherein v is the output rate of the outgoing packet at the inter-domain router.

In another general aspect, the present invention provides a token-based congestion control method for the Internet. A token level is inserted into the packet header. A terminal sets the token-level according to the congestion degree of networks. The tokens consumed by a packet are proportional to the token-level in the packet header. At the input port, a edge router limits the relayed token rate from a terminal to networks. When a packet arrives at an edge router, the edge router will check whether there are enough tokens in the token bucket controller to send the packet. If the available tokens are less than the amount demanded by the incoming packet, the incoming packet should be dropped by the edge router. If there are enough tokens, the edge router will accept the packet and decrease the amount of tokens in the token bucket controller. A physical congestion controller at the output interface of the core router adaptively adjusts a physical congestion threshold according to the congestion state at its output link. When the core router receives a packet with the token-level higher than its current physical congestion threshold, it accepts the packet. When the core router receives a packet with the token-level lower than its current physical congestion threshold, the packet is dropped randomly according to the fair probability, which is related with its current physical congestion threshold and the token-level of the packet. When the physical congestion controller outputs the packet with the token-level lower than its current physical congestion threshold, it sets the token-level of the packet the same as its current physical congestion threshold.

The method can further include the following steps. A physical congestion controller at the output port of the inter-domain router can adaptively adjust a physical congestion threshold according to the congestion state at its output link. When the inter-domain router receives a packet with the token-level higher than its current physical congestion threshold, it accepts the packet. When the inter-domain router receives a packet with the token-level lower than its current physical congestion threshold, the packets may be dropped randomly according to the fair probability, which is related to its current physical congestion threshold and the token-level of the packet. When the physical congestion controller outputs a packet with the token-level lower than its current physical congestion threshold, it sets the token-level of the packet the same as its current physical congestion threshold. A virtual congestion controller at the output port of the inter-domain router can adaptively adjust its operating parameter, i.e. the virtual congestion threshold, according to the congestion state of the token resource at its output link. The token-level of the packet outputted from the virtual congestion controller should be decreased the same amount as current virtual congestion threshold. At the input port, the inter-domain router limits the relayed token rate for other domains. When the inter-domain router receives a packet from another domain, it checks whether the token resource in its token bucket controller is enough for the incoming packet. If the token resource is not enough, the packet should be dropped. Otherwise, the packet is accepted and the token resource in its token bucket controller decreases.

The token resource consumed by a packet can be equal to the product of the packet length and the token-level of the packet. The physical congestion updating factor can be equal to the output rate of the physical congestion controller divided by the output link speed, in which the output rate is measured real-timely by the physical congestion controller. The physical congestion threshold can be updated by the multiplicative iterative procedure, i.e. the renewal physical congestion threshold is equal to the current physical congestion threshold multiplied by the physical congestion updating factor.

The virtual congestion updating factor can be equal to its current output token rate minus the allowable output token rate, and then divided by its current output rate, in which the current output token rate and the current output rate are measured real-timely by the virtual congestion controller. The virtual congestion threshold can be updated by the additive iterative procedure, i.e. the renewal virtual congestion threshold is equal to the current virtual congestion threshold plus the virtual congestion updating factor.

The fair probability of the physical congestion controller for a packet can be equal to its current physical congestion threshold minus the token-level of the packet, then multiplied by 1.1, and last divided by its current physical congestion threshold.

Besides the token level, the header of the data packet can also include a path token level, a token-level reduction value, a token-level potential reduction value, a reverse token level, a reverse token-level reduction value, and a previous token level. The path token level can be used to collect the highest physical congestion threshold on the transmission path. The token-level reduction value can be used to store the decreased token-level by the virtual congestion controller, which has resulted in the token-level increment at the source terminal. The token-level potential reduction value can be used to store the decreased token-level by the virtual congestion controller, which may result in the token-level increment at the source terminal in the follow-up core routers. The reverse token level can be used to return the path token level to the peer terminal, and the reverse token-level reduction value can be used to return the token-level reduction value to the peer terminal. The previous token level can be used to store the highest physical congestion threshold on the transmission path, which is previously known to the source terminal.

When the source terminal receives a packet returned from the peer terminal, it can store the congestion information in its cache. When the source terminal sends a packet to the peer terminal, it sets the token level of output packets equal to the sum of the reverse token-level and the reverse token-level reduction value of the returned packet from its cache. It further sets the reverse token level equal to the path token-level of the returned packet, the reverse token-level reduction value equal to the token-level reduction value of the returned packet, and the previous token level equal to reverse token-level of the returned packet. The source terminal initializes the path token level to the minimum, the reverse token level to zero, and the reverse token-level reduction value to zero.

When the physical congestion controller outputs a data packet, it updates the token level, the path token level, the token-level reduction value, and the token-level potential reduction value, which deliveries congestion information to terminals. If the token level is less than its current physical congestion threshold, the physical congestion controller should set the token level as its current physical congestion threshold. If the path token level is less than its current physical congestion threshold, the physical congestion controller should set the path token level as its current physical congestion threshold. The token-level potential reduction value should be decreased by the amount max(0, current token-level potential reduction value−max(0, the previous token-level−current physical congestion threshold)). The token-level reduction value should be increased by max(0, current token-level potential reduction value−max(0, the previous token-level−current physical congestion threshold)). When the virtual congestion controller outputs a data packet, it not only updates the token level, but also updates the token-level potential reduction value. The decrement of the token level and the increment of the token-level potential reduction value are equal to its current virtual congestion threshold.

Embodiments may include one or more of the following advantages. The disclosed system and methods provide an access control method that can decrease packet losses and reduce the traffic oscillation in networks. In the disclosed methods, a higher congestion level at a link requires a higher token-level in the packets passing the link, and consumes more token resources. Since a terminal has limited token resource, the flow rate allocated to the terminal decreases with increased level of congestion at a congested link.

The disclosed methods can also avoid congestion collapse in a computer network. In the disclosed methods, an optimum token-level can be determined using the disclosed algorithm for each flow given a limited access token resource, which allows the flow to achieve the highest throughput. Taking User Datagram Protocol (UDP) as an example, although flow rate can be increased by setting token level to be lower than the optimal token level provided by the disclosed algorithm, more data packets are to be lost at the congestion link, resulting in a decrease in the throughput. This incentive scheme can help to avoid congestion collapse.

The disclosed methods provide congestion control and fair resource to terminals without the need to monitor the behavior of every flow. The disclosed methods are thus simple and scalable. A network operator can insert a token bucket controller at the input port of the edge router and the inter-domain routers. The disclosed methods allows a network operator to prevent terminals from abusing network resource by controlling the physical congestion threshold at the output port of the core router and the inter-domain router, and the virtual congestion threshold at the output port of the inter-domain router.

The disclosed methods also provide fair resource and service quality to traditional network applications in the presence of BT downloads. The disclosed methods can also improve the network efficiency by transferring traffic to less utilized links.

The disclosed methods also provide a flexible pricing method based on the level of network congestions. Congested links consume more token resources and thus cost more for the passing packets.

Details of one or more embodiments are set forth in the accompanying drawing and in the description below. Other features, objects, and advantages of the invention will become apparent from the description and drawings, and from the claims.

BRIEF DESCRIPTION OF THE DRAWINGS

FIG. 1 illustrates an exemplified structure of a token header in a data packet to be transferred in a computer network in accordance to the present disclosure.

DETAILED DESCRIPTION

Figure 2:
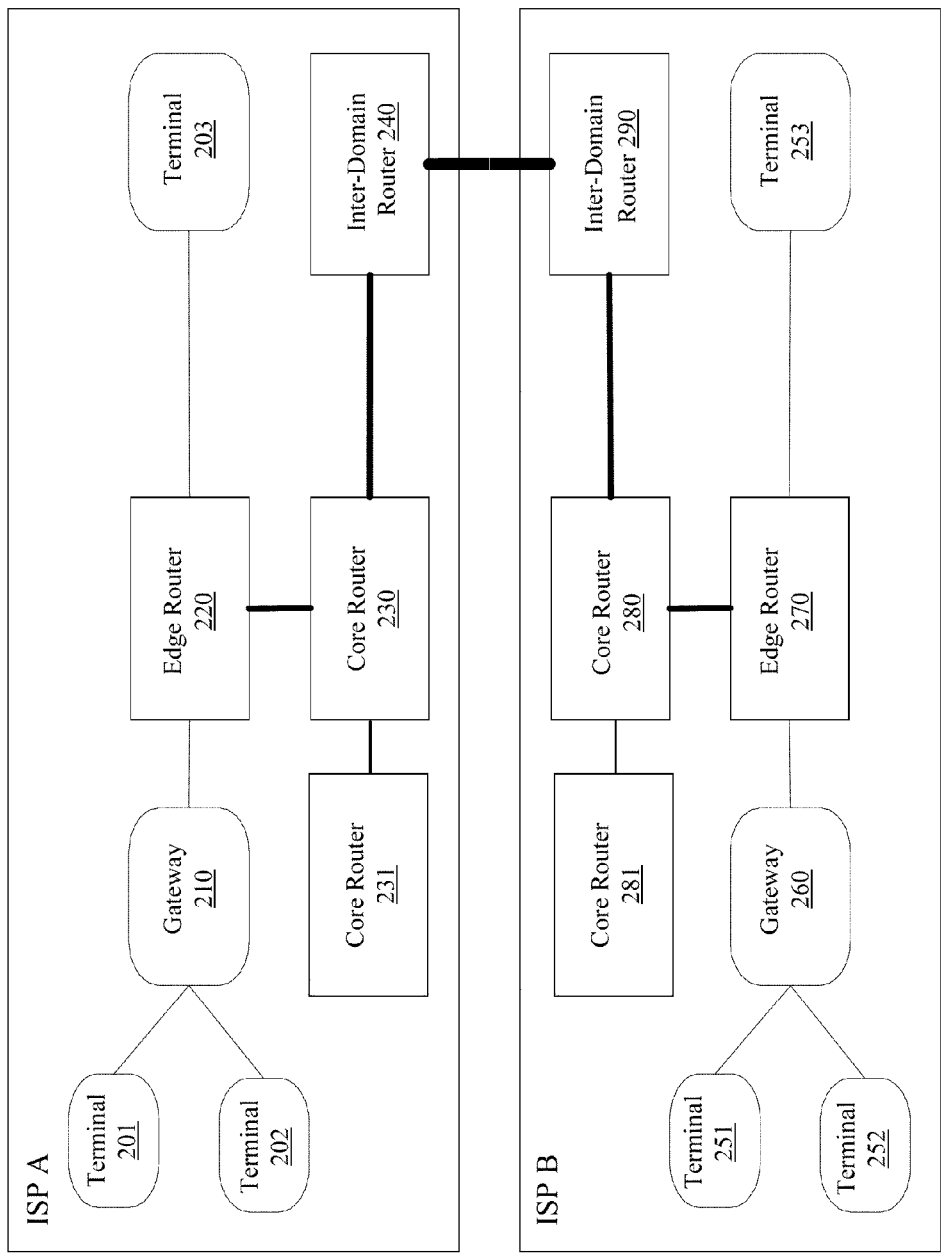
FIG. 2 illustrates a computer network compatible with the congestion control methods in the present disclosure.

In some embodiments, the present invention provides congestion control system in a computer network by extending the conventional Internet protocol. For example, a token header can be inserted into an IPv6 packet for providing congestion control. The identifier for the token header is 101, its keyword is TKLV. As shown in FIG. 1, the token header can include twelve octets (sequenced from the left to the right cell and from the top to the bottom row):

The first octet (Next Header) specifies the type identifier of the next packet header.

The second octet (Header length) specifies the length of the token header, which represents the number 8 Bytes in the token header excluding the first 8 Bytes. Its value is 1 in current version.

The third octet (Token Type) specifies the version of the extension header. For example, a value of 1 represents that the current version is the first version.

The fourth octet (Data Length or tklen) specifies the data length in the token header. It is 7 in current version.

The fifth octet (tklevel) specifies the token level, which has a value range from 10 to 100. Other values are reserved for the future. The token level may be increased or decreased when it passes the core router or the inter-domain router.

The sixth octet (tkpath) specifies the path token level, which has a value range from 10 to 100. Other values are reserved for the future. Its initial value is set to be 10 at the beginning of the transmission. It is used to collect the highest physical congestion threshold in the transmission path.

The seventh octet (tkdown) specifies the potential token-level reduction value, which has a value range from 0 to 90. Other values are reserved for the future. It is the sum of the virtual congestion threshold in the transmission path which has not resulted in the token-level increment at the source terminal.

The eighth octet (tkdowned) specifies the token-level reduction value, which has a value range from 0 to 90. Other values are reserved for the future. It is the sum of the virtual congestion threshold in the transmission path which has resulted in the token-level increment at the source terminal.

The ninth octet (tkprev) specifies the previous token level, which has a value range from 10 to 100. Other values are reserved for the future. It is the highest physical congestion threshold, known to the source terminal, collected in the last transmission path. It should not be modified on the transmission path by the networks.

The tenth octet (tkback) specifies the reverse token level, which has a value range from 10 to 100. Other values are reserved for the future. It stores the token level in the received packet to the peer terminal, and should not be modified in the transmission path by the networks.

The eleventh octet (tkbackdown) specifies reverse token-level reduction value, which has a value range from 0 to 90. It stores the token-level reduction value in the received packet to peer terminal, and should not be modified in the transmission path by the networks.

The twelfth, the thirteenth, the fourteenth, fifteenth and sixteenth octets are reserved as padding fields as defined in RFC2460—Internet Protocol, Version 6 (IPv6) Specification (IPv6).

FIG. 2 illustrates computer network compatible with the presently disclosed network congestion control methods. The computer network can for example be an IPv6 network. The computer network illustrates communications between two terminals respectively located in network domains provided by Internet Service Providers (ISP) A and ISP B. ISP A includes terminals 201-203, one or more gateways 210, one or more edge routers 220, core routers 230 and 231, and an inter-domain router 240. ISP B similarly includes terminals 251-253, one or more gateways 260, one or more edge routers 270, core router 280 and 281, and an inter-domain router 290.

Figure 3:
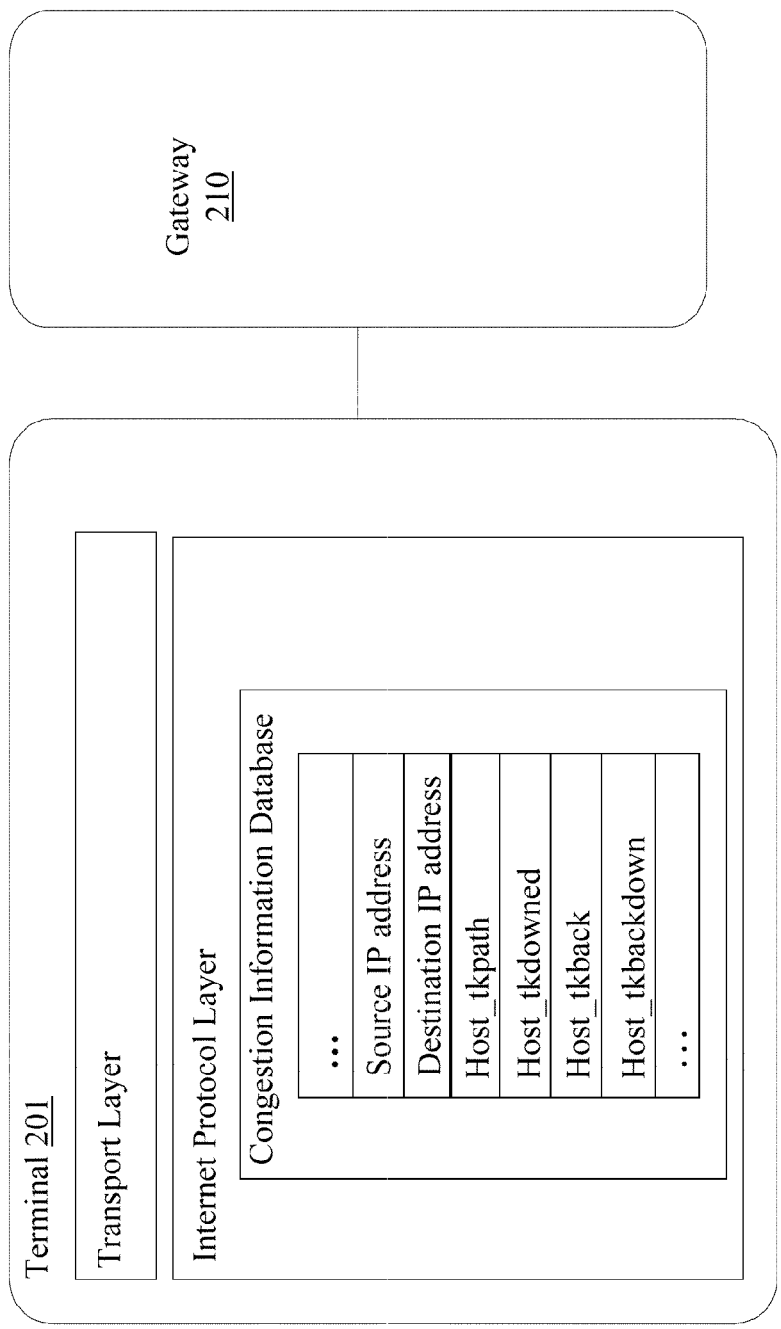
FIG. 3 illustrates an exemplified structure of the terminal in the computer network of FIG. 2.

As shown FIG. 3, a congestion information database (CID) is added into the Internet Protocol layer at the terminal 201 (or 202, 203, 251-253). The CID includes six tuples: source IP address, destination IP address, host_tkpath, host_tkdowned, host_tkback, and host_tkbackdown. The six tuples are indexed with the pair of source IP address and destination IP address. When the terminal 201 receives a packet from the networks, it updates the CID according to the token header of the received packet. When the terminal 201 sends the packet to the networks, it sets the token header of the packet according to the CID. When the terminal 201 receives a packet, it locates the six tuples in CID according to the source IP address and the destination IP address. The terminal 201 updates the item host_tkpath with the path token level in the packet, the host_tkdowned with the token-level reduction value in the packet, the item host_tkback with the reverse token level in the packet, and the item host_tkbackdown with the reverse token-level reduction value in the packet. The updating algorithm can be illustrated in equations as follows:

$$\begin{aligned}&\text{host\_tkpath} = \text{tkpath};\\&\text{host\_tkdowned} = \text{tkdowned};\\&\text{host\_tkback} = \text{tkback};\\&\text{host\_tkbackdown} = \text{tkbackdown};\end{aligned}$$

When the terminal 201 sends a packet, it locates the six-tuple in CID according to the source IP address and destination IP address. The terminal 201 sets the token level to the sum of the item host_tkback and the item host_tkbackdown, the previous token level to the item host_tkback, the reverse token level to the item host_tkpath, and the reverse token-level reduction value to the item host_tkdowned. Afterwards, the terminal 201 sets the path token level to 10, the token-level potential reduction value to 0, the token-level reduction value to 0. The initialization algorithm can be expressed in the following equations:

$$\begin{aligned}&\text{tklevel} = \text{host\_tkback} + \text{host\_tkbackdown};\\&\text{tkpath} = 10;\\&\text{tkdown} = 0;\\&\text{tkdowned} = 0;\\&\text{tkprev} = \text{host\_tkback};\\&\text{tkback} = \text{host\_tkpath};\\&\text{tkbackdown} = \text{host\_tkdowned}.\end{aligned}$$

The Gateways

Figure 4:
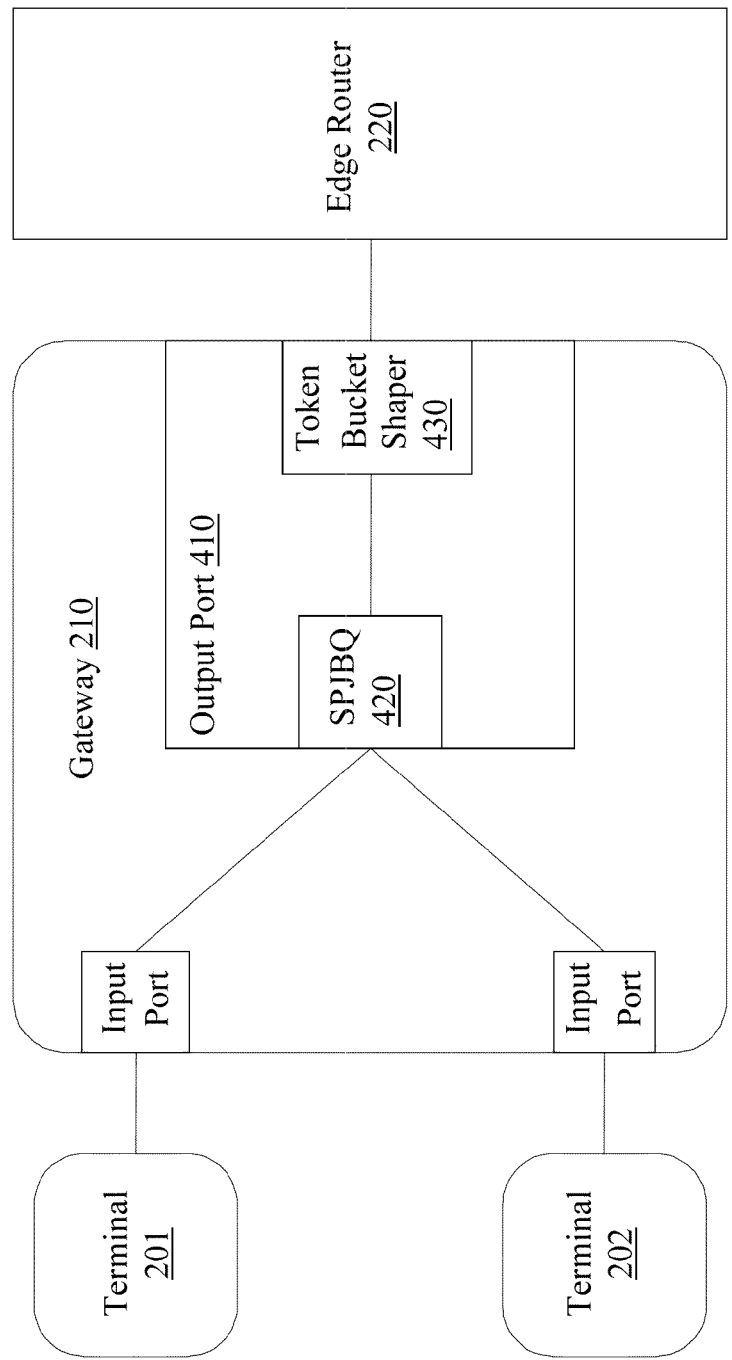
FIG. 4 illustrates an exemplified structure of the gateway in the computer network of FIG. 2.

Referring to FIG. 4, the gateway 210 is connected to the terminals 201, 202 and the edge router 220. The gateway 210 has an output port 410 that includes Start Potential-based Jitter Bounded Queuing (SPJBQ) 420 and the token-bucket shaper 430. The packets from a same terminal belong to the same session. SPJBQ 420 allocates the token resource among these sessions fairly. When there are enough tokens to send the next packet, the token-bucket shaper takes a packet from the output queue of SPJBQ and sends it to the networks. The token-bucket shaper 430 is configured with the same parameters of the token capacity and the token arrival rate as the token-bucket controller in the edge router 220, which guarantees the output token rate is consistent with the contract with the network operator.

The Edge Routers

Figure 5:
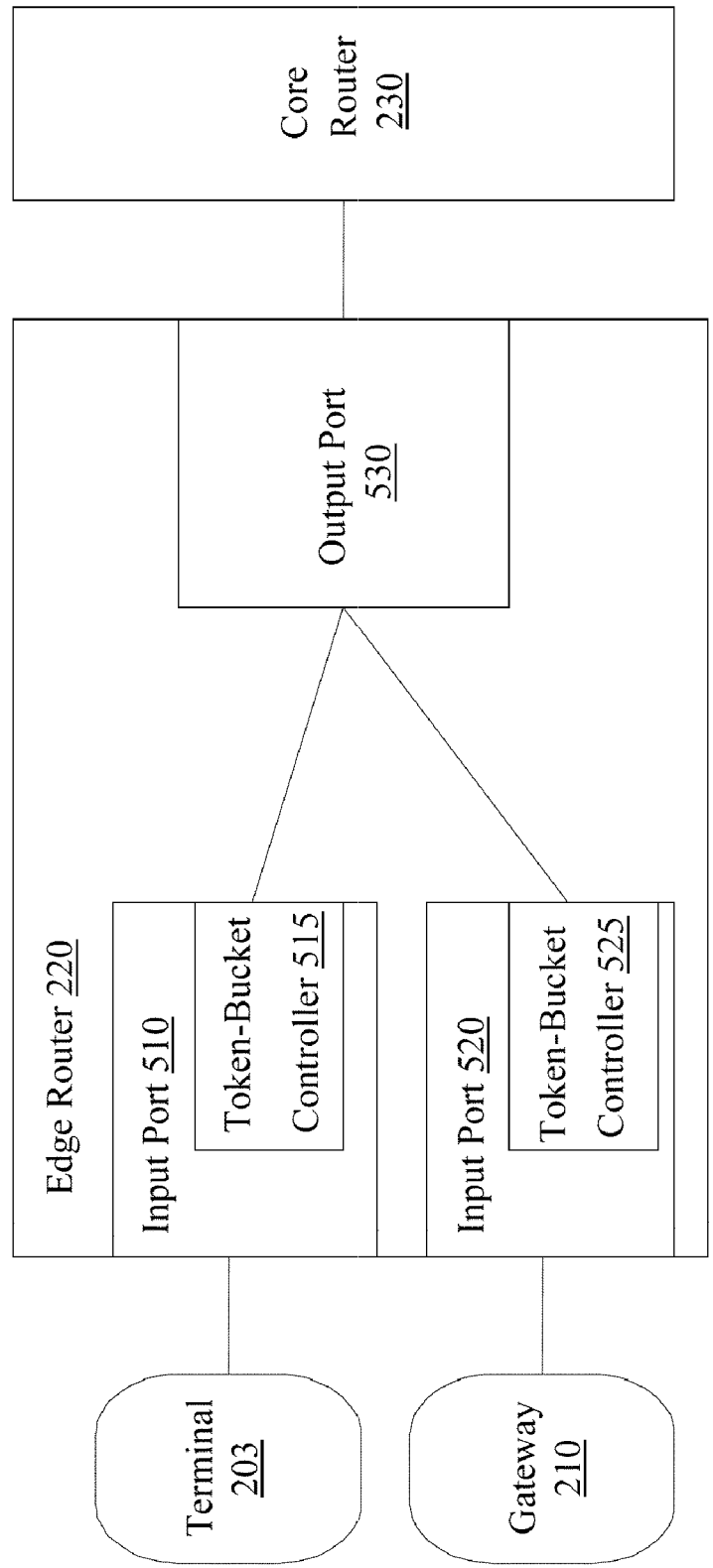
FIG. 5 illustrates an exemplified structure of the edge router in the computer network of FIG. 2.

As FIG. 5, the edge router 220 is connected with the terminal 203, the gateway 210, and the core router 230. The edge router 220 includes token-bucket controllers 515, 525 in each of its input port 510, 520. The token-bucket controller 515, 525 stores token resource, which is a counter that counts token numbers available to packets at the token-bucket controller 515, 525. The token resource has a maximum token capacity D and increases at a constant rate S. When the edge router 220 receives a packet from the gateway 210, the packet is dropped if the token resource in the token-bucket controller 515, 525 is below the product of the packet size and the token level of the passing packet. Otherwise, the packet passes the input port 520 while the token resource in the token-bucket controller 525 is reduced by the product of the packet size and the token level of the passing packet.

The Core Routers

Figure 6:
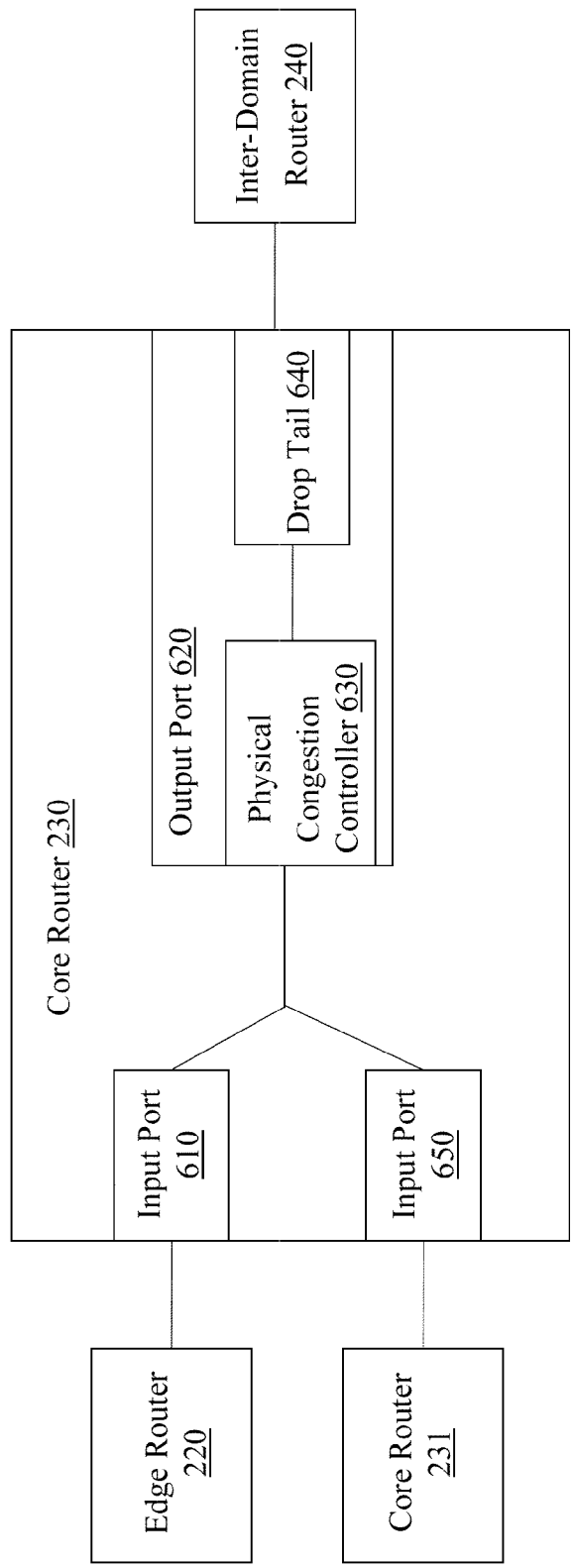
FIG. 6 illustrates an exemplified structure of the core router in the computer network of FIG. 2.

A core router connects only with trusted routers in the same domain. Referring to FIG. 6, the core router 230 is connected with the edge router 220, the core router 231 and the inter-domain router 240. The core router 230 includes input ports 610, 650 and an output port 620. The output port 620 includes a physical congestion controller 630 and a drop tail 640. The physical congestion controller 630 includes a physical fair queuing (PFQ) algorithm. An important parameter of PFQ is the physical congestion threshold $\alpha$, an integer in a range between 10 and 100. PFQ in the physical congestion controller 630 performs the functions of adaptively adjusting the physical congestion threshold $\alpha$, randomly dropping the incoming packet according to the fair probability, and updating the items in the token header.

The output rate v of the physical congestion controller 630 is a dynamic data output rate that changes in response to the traffic in the computer network. The output rate v is estimated using exponential averaging. The link speed C is an equipment parameter specified to the core router 230. If v is great than the link speed C of the output port 620, the link (i.e. the output port 620) is in a state of physical congestion. Otherwise, the link is physically idle. The v/C ratio thus reflects the congestion state of the link. A higher v/C ratio indicates a more congested output port 620.

The adaptive updating algorithm of the physical congestion-threshold $\alpha$ is as follows. If the output port 620 is persistently congested, the associated physical congestion-threshold $\alpha$ is increased. If the output port 620 is persistent physical idle, the associated physical congestion-threshold $\alpha$ is decreased. The updated physical congestion-threshold $\alpha$ is obtained by multiplying the current physical congestion-threshold by the v/C ratio.

The PFQ in the physical congestion controller 630 drops packets based on a fair loss algorithm. If the token level $\gamma$ of an incoming packet is higher than current $\alpha$, the physical fair queuing accepts the incoming packet. If $\gamma$ of the incoming packet is lower than current $\alpha$, the loss probability $\rho$ of the incoming packet is $1.1*(\alpha-\gamma)/\alpha$. It means that there is a probability $\rho$ for the PFQ to drop the incoming packet and there is a probability $1-\rho$ for the PFQ to accept the incoming packet.

When the PFQ outputs the packet, if the token-level $\gamma$ of the passing packet is less than the current $\alpha$, it updates the token level $\gamma$ of the passing packet to the value of the current $\alpha$. If the path token level is less than current physical congestion-threshold $\alpha$, the PFQ also updates the path token level to current physical congestion-threshold $\alpha$. The token-level potential reduction value decreases by the amount of max(0, tkdown−max(0, tkprev−$\alpha$)). The token-level reduction value increases by the amount of max(0, tkdown−max(0, tkprev−$\alpha$)). The above descriptions can be expressed by the following equations:

If tklevel<$\alpha$,  then tklevel = $\alpha$;
If tkpath<$\alpha$,   then tkpath=$\alpha$;

-continued tkdowned += max(0, tkdown − max(0, tkprev−$\alpha$));
tkdown − = max(0, tkdown − max(0, tkprev−$\alpha$)).

The Inter-Domain Routers

Figure 7:
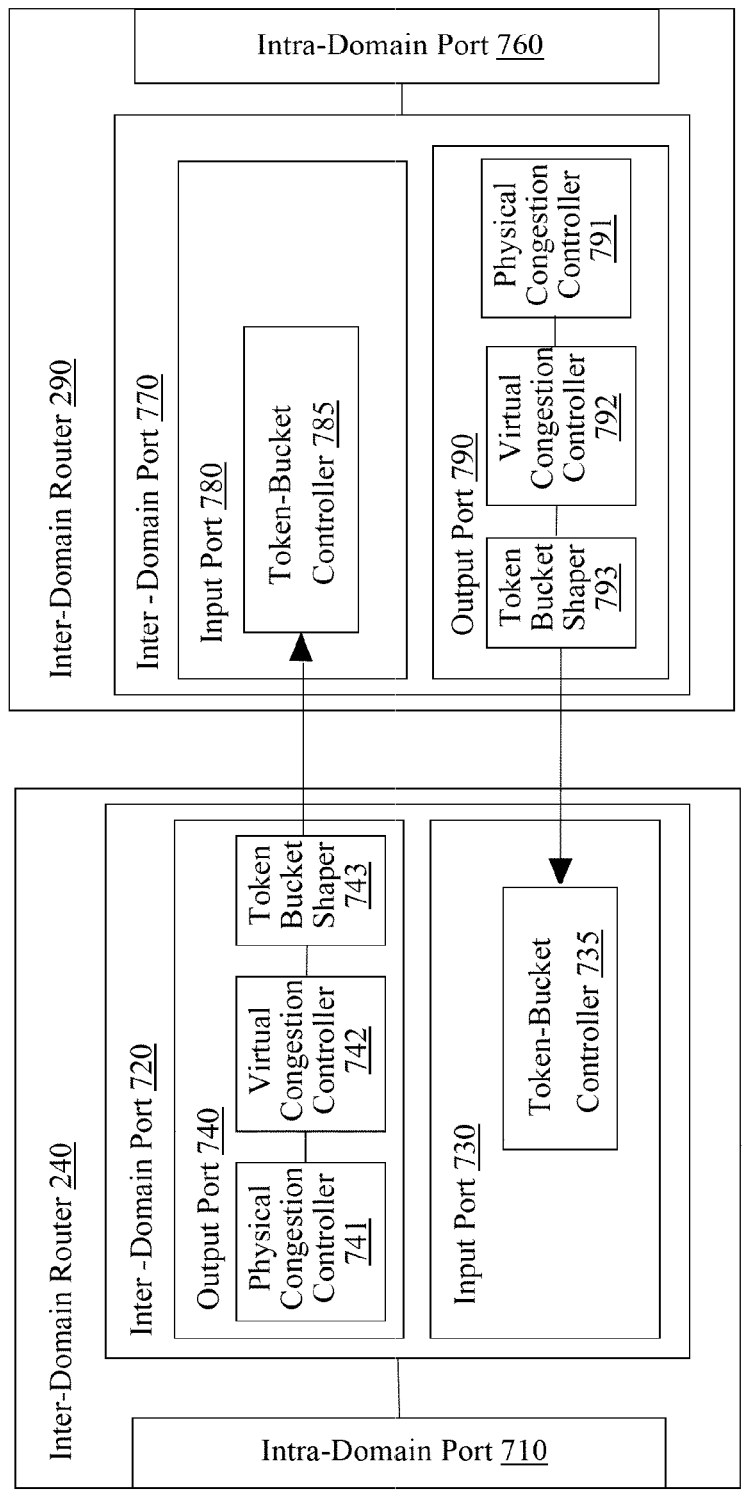
FIG. 7 illustrates an exemplified structure of the inter-domain router in the computer network of FIG. 2.

FIG. 7 shows a pair of inter-domain routers 240 and 290. The inter-domain router 240 includes an intra-domain port 710 and an inter-domain port 720. The intra-domain port 710 has the same components as the output port 620 of the core router 230 and performs similar functions. The inter-domain port 720 includes an input port 730 and an output port 740. The input port 730 includes a token-bucket controller 735. The output port 740 includes a physical congestion controller 741, a virtual congestion controller 742, and a token bucket shaper 743. The inter-domain router 290 includes an intra-domain port 760 and an inter-domain ports 770. The intra-domain port 760 has the same components as the output port 620 of the core router 230 and performs similar functions. The inter-domain port 770 includes an input port 780 and an output port 790. The input port 780 includes a token-bucket controller 785. The output port 790 includes a physical congestion controller 791, a virtual congestion controller 792, and a token bucket shaper 793.

The output port 740 is connected to the input port 780. The input port 730 is connected to the output port 790. At the input port 780, the token-bucket controller 785 determines the token capacity D and the token arrival rate S according to the contract between the two network domains. If there is no enough token resource in the token bucket controller 785 to relay the packet received from the inter-domain router 240, the packet should be dropped. Otherwise, the inter-domain router 290 accepts the packet, and reduces the token resource in the token bucket controller 785.

In the output port 740, 790, the physical congestion controller 741, 791 controls the data rate between network domains based on the available bandwidth. The term "physical" refers to the network bandwidth, which is a physical condition of a network link. The specific functions of the physical congestion controller 741, 791 are similar to those performed by the physical congestion controller 630, 680 in the core router 230, 280. The physical congestion controller 741, 791 each includes a PFQ algorithm. An important parameter of PFQ is the physical congestion threshold $\alpha$, an integer in a range between 10 and 100. PFQ in the physical congestion controller 741, 791 adaptively adjusts the physical congestion threshold $\alpha$, randomly drops the outgoing packet according to the fair probability, and updates the items in the token header. If the output port 740, 790 is persistently congested, the associated physical congestion-threshold $\alpha$ is increased. If the output port 740, 790 is persistent physical idle, the associated physical congestion-threshold $\alpha$ is decreased. The PFQ in the physical congestion controller 741, 791 drops packets based on a fair loss algorithm. If the token level $\gamma$ of an outgoing packet is higher than the current $\alpha$, the PFQ accepts the outgoing packet. If $\gamma$ of the outgoing packet is lower than current $\alpha$, the loss probability $\rho$ of the outgoing packet is $1.1*(\alpha-\gamma)/\alpha$. It means that there is a probability $\rho$ for the PFQ to drop the outgoing packet and there is a probability $1-\rho$ for the PFQ to accept the outgoing packet.

The virtual congestion controller 742, 792 is included respectively in the output port 740, 790 of the inter-domain routers 240, 290 to provide additional control to token output rates of the outgoing packets between network domains. The token output rate is defined as the product of the token level and the packet length transferred in a unit time. The term "virtual" is used to refer to the additional parametric token values assigned to the data packets in the present disclosure. Control of token rate is necessary at the boundary between network domains so that the packet output rate from a network domain needs to be controlled in response to congestion states in both the same network domain and the neighboring network domain receiving the packet. A physical congestion controller is not enough to control the token rate between network domains. When the physical congestion threshold increases, the output rate at the domain border decreases. The output token rate, however, can remain the same because the token level of the output packet increases at the same time.

The virtual congestion controller 742 or 792 includes a virtual fair queuing (VFQ) algorithm that includes an important parameter, the virtual congestion threshold κ, which controls the token output rate and the decrement in token level of the passing packet. The virtual congestion threshold κ is an integer ranging from 0 to 90. VFQ is configured to adaptively adjust the virtual congestion threshold κ and decrease the token-level of the output packet.

The data output rate for the transferring packets between the inter-domains 240 and 290 is ν. The token output rate μ at the virtual congestion controller 742, 792 is a dynamic data output rate that changes in response to the traffic in the computer network. The allowable token output rate S of the virtual congestion controller 742, 792 respectively has the same value as the token arrival rate at the input port 735, 785. Both ν and μ can be measured using exponential averaging algorithm. If the token output rate μ is greater than the allowable token output rate S, the output port 790 (or 740) is in virtual congestion. Otherwise, the output port 790 is virtual idle. The higher the μ/S ratio, the output port is more virtually congested. The μ/S ratio thus represents the state and the degree of virtual congestion at the link. The virtual congestion threshold κ is increased if the output port 790 is persistently in a virtual congestion. The virtual congestion threshold κ is decreased if the output port 790 is persistently in a virtual idle. The update virtual congestion-threshold κ is equal to current virtual congestion threshold κ plus a virtual congestion increment δ, wherein δ is equal to (μ−S)/ν.

When a packet is output from VFQ, the token level of the packet is decreased by κ. The token-level potential reduction value is increased by κ:

```
tklevel − = κ;
tkdown += κ.
```

In the virtual congestion controller 792, an incoming packet having a length L and a token level γ can consume the token resource in the token bucket shaper 793 by L*(γ−κ). When the token-bucket shaper 793 has enough tokens to send the next packet, the token-bucket shaper 793 takes a packet from the output queue of the Virtual Fair Queuing and sends the packet to the token-bucket controller 735 in the input port 730 in the peer inter-domain router 240.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although congestion control methods are described above using specific terminals, gateways, edge routers, core routers, and inter-domain routers as examples, the described methods are applicable to other components in the same ISP and to other ISPs. The foregoing description of the embodiments of this invention has been presented for purposes of illustration and description. It is not intended to be exhaustive or to limit the invention to the precise form disclosed, and many modifications and variations are possible.

What is claimed is:

1. A computer network system with congestion control, comprising:

an edge router in a first computer network domain and in communication with a source terminal in the first network domain, wherein the edge router is configured to receive an outgoing packet from the source terminal, the outgoing packet having a packet length and a packet header that includes a token level, wherein the edge router comprises a first token-bucket controller configured to pass the outgoing packet when the first token resource is more than the product of the token level and the packet length, wherein the first token-bucket controller is configured to drop the outgoing packet when the first token resource is less than the product of the token level and the packet length;

a core router in the first computer network domain and in communication with the edge router, wherein the core router comprises a first physical congestion controller configured to pass the outgoing packet received from the edge router when the token level in the outgoing packet is higher than a first physical congestion threshold, wherein the first physical congestion controller is configured to randomly drop the outgoing packet at a first fair probability when the token level in the outgoing packet is lower than the first physical congestion threshold, wherein the first fair probability is dependent on the first physical congestion threshold and the token level; and an inter-domain router in the first computer network domain and in communication with the core router and a second network domain, wherein the inter-domain router comprises a second physical congestion controller configured to pass the outgoing packet received from the core router to the second network domain when the token level in the outgoing packet is higher than a second physical congestion threshold, wherein the second physical congestion controller is configured to randomly drop the outgoing packet received from the core router at a second fair probability when the token level in the outgoing packet is lower than the second physical congestion threshold, wherein the second fair probability is dependent on the second physical congestion threshold and the token level.

2. The computer network system of claim 1, wherein the first token-bucket controller is configured to decrease the first token resource in the edge router by the product of the packet length and the token level of the outgoing packet when the first token-bucket controller allows the outgoing packet to pass.

3. The computer network system of claim 1, wherein the inter-domain router further comprises a second token-bucket controller configured to receive an incoming packet from the second network domain, wherein the second token-bucket controller is configured to pass the incoming packet to the first network domain when the product of the token level and the packet length of the incoming packet is less than a second token resource in the second token-bucket controller, wherein the second token-bucket controller is configured to decrease the second token resource by the product of the token level and the packet length in the incoming packet, wherein the second token-bucket controller is configured to drop the incoming packet when the product of the token level and the packet length of the incoming packet is more than the second token resource.

4. The computer network system of claim 1, wherein the first physical congestion controller in the core router is configured to allow the outgoing pack to pass at a probability equal to one minus the first fair probability when the token level in the outgoing packet is lower than the first physical congestion threshold, wherein the first physical congestion controller in the core router is configured to set the token-level of the outgoing packet to the first physical congestion threshold.

5. The computer network system of claim 1, wherein the second physical congestion controller in the inter-domain router is configured to allow the outgoing pack to pass at a probability equal to one minus the second fair probability when the token level in the outgoing packet is lower than the second physical congestion threshold, wherein the second physical congestion controller in the core router is configured to set the token-level of the outgoing packet to the second physical congestion threshold.

6. The computer network system of claim 1, wherein the first physical congestion controller in the core router is configured to obtain an updated physical congestion threshold by multiplying the physical congestion threshold by a v/C ratio, wherein v is the output rate of the outgoing packet at the physical congestion controller and C is the link speed of the core router.

7. The computer network system of claim 1, wherein the first fair probability is the difference between the first physical congestion threshold and the token level of the outgoing packet at the core router, multiplied by 1.1 and divided by the first physical congestion threshold.

8. The computer network system of claim 1, wherein the second fair probability is the difference between the second physical congestion threshold and the token level of the outgoing packet at the inter-domain router, multiplied by 1.1 and divided by the second physical congestion threshold.

9. A computer network system with congestion control, comprising:
an edge router in a first computer network domain and in communication with a source terminal in the first network domain, wherein the edge router is configured to receive an outgoing packet from the source terminal, the outgoing packet having a packet length and a packet header that includes a token level, wherein the edge router comprises a first token-bucket controller configured to pass the outgoing packet when the first token resource is more than the product of the token level and the packet length, wherein the first token-bucket controller is configured to drop the outgoing packet when the first token resource is less than the product of the token level and the packet length;
a core router in the first computer network domain and in communication with the edge router, wherein the core router comprises a first physical congestion controller configured to pass the outgoing packet received from the edge router when the token level in the outgoing packet is higher than a first physical congestion threshold, wherein the first physical congestion controller is configured to randomly drop the outgoing packet at a first fair probability when the token level in the outgoing packet is lower than the first physical congestion threshold, wherein the first fair probability is dependent on the first physical congestion threshold and the token level; and
an inter-domain router in the first computer network domain and in communication with the core router and a second network domain, wherein the inter-domain router comprises:
a second physical congestion controller configured to pass the outgoing packet received from the core router to the second network domain when the token level in the outgoing packet is higher than a second physical congestion threshold, wherein the second physical congestion controller is configured to randomly drop the outgoing packet received from the core router at a second fair probability when the token level in the outgoing packet is lower than the second physical congestion threshold, wherein the second fair probability is dependent on the second physical congestion threshold and the token level; and
a virtual congestion controller in communication with the second physical congestion controller and configured to decrease the token level of the outgoing packet by a virtual congestion threshold κ when the outgoing packet passes the virtual congestion controller.

10. The computer network system of claim 9, wherein the virtual congestion controller is configured to increment the virtual congestion threshold by $(\mu-S)/\nu$, wherein $\mu$ is the output rate of the product of the token level and the packet length in the outgoing packet, wherein S is the allowable token output rate of the virtual congestion controller, wherein $\nu$ is the output rate of the outgoing packet at the inter-domain router.

11. A method for congestion control in a computer network, comprising:
receiving an outgoing packet by an edge router from a source terminal, wherein the edge router and the source terminal are in a first computer network domain, wherein the outgoing packet has a packet length and a packet header that includes a token level, wherein the edge router comprises a first token-bucket controller;
passing the outgoing packet by the first token-bucket controller when the first token resource is more than the product of the token level and the packet length;
dropping the outgoing packet by the first token-bucket controller when the first token resource is less than the product of the token level and the packet length;
receiving the outgoing packet from the edge router by a core router in the first computer network domain, wherein the core router comprises a first physical congestion controller;
passing the outgoing packet by the first physical congestion controller when the token level in the outgoing packet is higher than a first physical congestion threshold;
randomly dropping the outgoing packet at a first fair probability by the first physical congestion controller when the token level in the outgoing packet is lower than the first physical congestion threshold, wherein the first fair probability is dependent on the first physical congestion threshold and the token level;
receiving the outgoing packet from the core router by an inter-domain router in the first computer network domain, the inter-domain router comprises a second physical congestion controller;
passing the outgoing packet by the second physical congestion controller toward the second network domain when the token level in the outgoing packet is higher than a second physical congestion threshold; and
randomly dropping the outgoing packet at a second fair probability by the second physical congestion controller when the token level in the outgoing packet is lower than the second physical congestion threshold, wherein the second fair probability is dependent on the second physical congestion threshold and the token level.

12. The method of claim 11, further comprising decreasing the first token resource in the edge router by the product of the packet length and the token level of the outgoing packet when the first token-bucket controller allows the outgoing packet to pass.

13. The method of claim 11, wherein the inter-domain router further comprises a second token-bucket controller, the method further comprising;
receiving an incoming packet by the second token-bucket controller from the second network domain;
passing the incoming packet to the first network domain by the second token-bucket controller when the product of the token level and the packet length of the incoming packet is less than a second token resource in the second token-bucket controller;
decreasing the second token resource by the product of the token level and the packet length in the incoming packet; and
dropping the incoming packet by the second token-bucket controller when the product of the token level and the packet length of the incoming packet is more than the second token resource.

14. The method of claim 11, wherein the first physical congestion controller in the core router is configured to allow the outgoing pack to pass at a probability equal to one minus the first fair probability when the token level in the outgoing packet is lower than the first physical congestion threshold, wherein the first physical congestion controller in the core router is configured to set the token-level of the outgoing packet to the first physical congestion threshold.

15. The method of claim 11, wherein the second physical congestion controller in the inter-domain router is configured to allow the outgoing pack to pass at a probability equal to one minus the second fair probability when the token level in the outgoing packet is lower than the second physical congestion threshold, wherein the second physical congestion controller in the core router is configured to set the token-level of the outgoing packet to the second physical congestion threshold.

16. The method of claim 11, wherein the first physical congestion controller in the core router is configured to obtain an updated physical congestion threshold by multiplying the physical congestion threshold by a v/C ratio, wherein v is the output rate of the outgoing packet at the physical congestion controller and C is the link speed of the core router.

17. The method of claim 11, wherein the first fair probability is the difference between the first physical congestion threshold and the token level of the outgoing packet at the core router, multiplied by 1.1 and divided by the first physical congestion threshold.

18. The method of claim 11, wherein the second fair probability is the difference between the second physical congestion threshold and the token level of the outgoing packet at the inter-domain router, multiplied by 1.1 and divided by the second physical congestion threshold.

19. The method of claim 11, wherein the inter-domain router further comprises a virtual congestion controller in communication with the second physical congestion controller, wherein the token level of the outgoing packet is decreased by a virtual congestion threshold κ when the outgoing packet passes virtual congestion controller.

20. The method of claim 19, wherein the first virtual congestion controller in the inter-domain router is further configured to update the virtual congestion threshold by incrementing it by $(\mu-S)/v$, wherein $\mu$ is the output rate of the product of the token level and the packet length, wherein S is the allowable token output rate of the virtual congestion controller, and wherein v is the output rate of the outgoing packet at the inter-domain router.

21. The method of claim 11, further comprising inserting the token level into the packet header of the outgoing packet by the source terminal.

22. The method of claim 21, wherein the packet header of the outgoing packet further includes a path token level configured to collect a highest physical congestion threshold on a packet's transmission path, a token-level reduction value, a token-level potential reduction value, a reverse token level, a reverse token-level reduction value, and a previous token level.

23. The method of claim 22, further comprising:
receiving, the source terminal, an incoming packet returned from a peer terminal in the second network domain, wherein the source terminal stores the reverse token-level and the reverse token-level reduction value in the incoming packet; and
setting the token level of a follow-up outgoing packet to the peer terminal to be the sum of the reverse token-level and the reverse token-level reduction value of the incoming packet.

24. The method of claim 23, further comprising:
sending the follow-up outgoing packet from the source terminal to the peer terminal; and
setting the reverse token level, the reverse token-level reduction value, and the previous token level in the packet header of follow-up outgoing packet to be respectively equal to the path token-level, the token-level reduction value, and reverse token-level of the incoming packet.

* * * * *